Patented Oct. 21, 1941

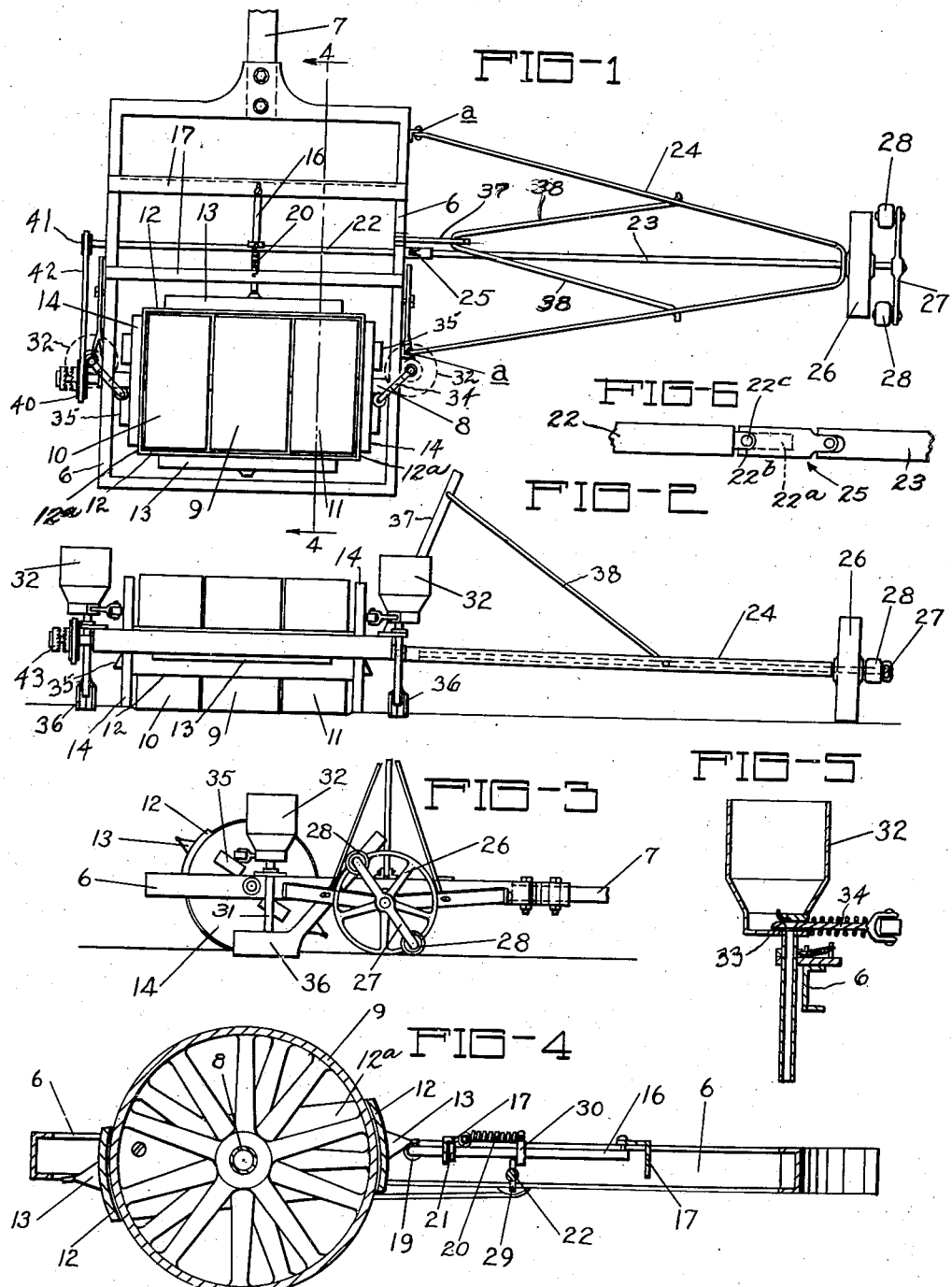

2,260,023

UNITED STATES PATENT OFFICE 2,260,023

CORN PLANTER

Arthur J. Haemer, East Moline, Ill.

Application August 22, 1939, Serial No. 291,345

4 Claims. (Cl. 111—25)

My invention has reference to a corn planter, and has for its chief purpose to provide a machine of that kind which contains its own marking and dropping devices, and does away with the use of any check-row chains or mechanism, or similar apparatus.

The invention is simple in construction, and is made up of a limited number of operative parts. It includes an automatic corn dropping mechanism, having ground controls operative upon their entering cross-channels or furrows in their path, and causing the formation of other furrows in line with those already formed. Mechanism is also provided for the dropping of several kernels of corn, or other grain, in line with the marking, and simultaneously with the forming of the new furrows.

The particular construction, arrangement, and mode of operation of the several devices making up the machine will be more fully understood from the following specification, taken in connection with the accompanying drawing, in which—

Fig. 1 is a plan view of a machine equipped with the invention.

Fig. 2 is a rear view thereof.

Fig. 3 is a side view of the machine, from the side showing the marker control mechanism.

Fig. 4 is an enlarged sectional view of the roller, with the trip devices in side elevation.

Fig. 5 is a detail of the hopper mechanism, in vertical section.

Fig. 6 is a detail of a combined universal joint and slip-joint.

The reference number 6 indicates a carrying frame, provided with some kind of traction means, as indicated by a fragmentary tongue 7. Rotatably mounted in the frame 6 is a shaft 8, to which is fixed a roller 9, at the ends of which are drums 10 and 11 of the same diameter as that of the roller, rotating freely on the shaft 8. Supported transversely of the roller and drums is a pair of arcuate plates 12, provided on their faces with V-shaped markers 13, and united integral end plates 12a, to which are attached disks 14, also rotating freely on said shaft. The disks and plates rotate in unison, and are caused to revolve by the contact with the ground of said disks. The roller and drums provide a ground support for the frame, and also afford a means for the quick turning of the machine, with the roller 9 acting as a pivotal point.

At each half-turn of the disks 14 one of the markers 13 forms a cut or cross furrow in the ground, of a size and shape corresponding with that of the marker. The movement of the disks 14 and markers carried thereby is interrupted, however, by means of a slide-bar 16, supported by cross-bars 17 of the frame 6. The end of the slide-bar near the marker is provided with a roller 19, upon which the marker rests. The contact of said parts is made positive by means of a spring 20 mounted on the bar 16, and connecting a clip 30 on said bar with the rear cross-piece 17.

Rotatably mounted in the frame 6 is a shaft 22, extending from one end of which is a shaft 23, supported at its outer end by a V-frame 24, the arms of which have pivotal connections with the frame 6, as at a. The shafts 22 and 23 are drivingly connected by means of a combined universal joint and slip-joint connection 25 which permits a movement of the shaft 23 upwardly and provides for disconnecting of the drive by such upward movement. One end of the connection carries the universal joint which is connected to one end of the shaft 23 while the other end is formed with a circular hole or socket and adapted to receive a reduced end 22a of shaft 22 of circular cross-section whereby relative rotation is possible. The socket end of the connection is provided with opposite notches 22b which are adapted to receive a pin 22c passing through the reduced end. The arrangement is such that when shaft 23 is in a lowered position the pin is in the notches and shafts 22 and 23 are operatively connected; and when shaft 23 is elevated the pin is pulled out of the notches rendering the drive connection between the shafts 22 and 23 inoperative, and shaft 22 can rotate independently. On the outer end of the shaft 23 is a cross-head 27, carrying a pair of rollers 28, which parts are supported by a carrying wheel 26. Upon a cross-furrow being encountered by the roller 28 which is nearest the bottom of the wheel, the roller enters the furrow and engages therewith, causing a rotary movement of the shaft 23, also of the shaft 22, and causing a lug 29 on the shaft 22 to engage the clip 30 on the bar 16, forcing such bar forwardly, and releasing the marker 13, and rotatable parts connected therewith. This permits the turning of the disks 14 and markers connected therewith, as before mentioned. As the marker which is at the front moves downwardly, a quarter-turn of the disks will bring the marker to a point in the ground in line with the furrow entered by the roller 28, ready for a similar operation of one of said rollers on the return trip of the machine.

The markers 13 are of sufficient length to allow for any ordinary side movement of the machine, and the ground is thoroughly rolled and smoothed just ahead of the markers by the roller 9, and drums 10 and 11.

Supported at the sides of the frame 6 are hoppers 32 to receive a quantity of grain for seed, which hoppers contain the usual dropping mechanism, as shown at 33, actuated by arms 34, provided on their ends with rollers for engagement with cams 35 on the outer faces of the disks 14. By this means the desired number of grains may be made to pass downwardly through tubes 31, into the path of furrow openers 36, supported from the main frame. The operation of the dropping mechanism is timed to drop the grain as the hopper is above one of the cross-furrows, so that the lines of grain will be continuous transversely of the field. In planting the first row or so of corn the frame 24 can be supported with the wheel 26 out of engagement with the ground, by means of a hand-lever 37 on the frame 6, connected with the frame 24 by rods 38. By this means shaft 23 and associated parts are tipped upwardly and the drive connection between the shafts 22 and 23 rendered inoperative. At such times the shaft 22 is driven directly from the shaft 8, by means of a pulley 40, on the end of the shaft 8, connected with a similar pulley 41 on the shaft 22, by means of a belt 42. The pulley 40 has a clutch connection with the shaft 8 at 43, provided with means for disengagement of the clutch, not shown herein.

In ordinary practice the machine is driven along one side of a field which has been prepared for planting, with the shaft 22 elevated, and the clutch mechanism at 43 in engagement. The shaft 22 is then driven from the shaft 8, with the bar 16 operating at regular intervals to permit release and downward movement of the marker 13, and the entering into the ground and forming a cross-furrow thereby. At the same time the corn dropping mechanism is actuated, planting a hill of the grain at each end of the cross-furrow, in line therewith. At the end of the field the machine is turned round, and returned to the starting point on a line parallel with the first rows formed, with the roller device engaging the cross-furrows which were first formed, and the marker instruments forming new cross-furrows in line with those first made. On the return trip an additional two rows of corn are planted, the length of the frame 24 permitting a suitable spacing of said rows with reference to the rows first formed.

The operation set forth above is repeated until the field is fully planted.

What I claim, and desire to secure, is:

1. A corn planter, comprising a main frame, a portable support therefor comprising a central roller and end drums independently rotatable, rotatable ground contacting disks at the ends of said support provided with spaced markers for forming cross-furrows in the ground, trip devices normally holding said markers and disks from rotation, an auxiliary frame secured at one side of the main frame, a shaft rotatably mounted in the auxiliary frame, a rotary member on the outer end of said shaft carrying a pair of furrow engaging rollers, and connections between said shaft and said trip devices to release the same upon rotation of said rotary member and shaft by engagement of one of said rollers with a cross-furrow.

2. A corn planter, comprising a main frame, a support therefor consisting of a shaft and roller devices carried thereby, a ground contacting apparatus including a pair of disks rotatable on said shaft and united by cross-furrow forming devices, means for holding said apparatus from rotation, an auxiliary frame at the side of the main frame, mechanism carried thereby operatively connected with said last-named means, and adapted to release the same upon engagement with a cross-furrow, seed hoppers on the main frame, and dropping mechanism therefor, and means carried by said ground contacting apparatus operatively connected with said dropping mechanism, to actuate the same coincidently with the forming of a cross-furrow in the ground.

3. In a corn planter, a main frame, a cross-shaft rotatably connected with said frame, ground-smoothing and frame carrying rollers on said shaft, a ground-contacting frame supported rotatably on said shaft, and provided with cross-furrow forming devices, trip mechanism on said frame holding said last-named frame from rotation, a secondary shaft provided with means for releasing said trip mechanism by rotation of said secondary shaft, an auxiliary frame at one side of the main frame, an extension of said secondary shaft supported by said auxiliary frame, and having a universal joint connection with said secondary shaft, a carrying wheel near the end of said extension, a cross-head on the end of said extension, and rollers on said cross-head engageable with a cross-furrow to rotate said extension and secondary shaft.

4. A corn planter, comprising a portable frame, a rotatable ground contacting and smoothing apparatus, a rotatable frame associated with said apparatus, and provided with devices for forming cross-furrows in the ground, means for holding said rotatable frame from rotation, an auxiliary frame supported at one side of the main frame, a rotary member carried by said auxiliary frame, operatively connected with said holding means, and including a pair of spaced rollers adapted to engage a cross-furrow, and actuate said rotary member to release such roller frame at each engagement of a roller with a cross-furrow.

ARTHUR J. HAEMER.